Figure 1:
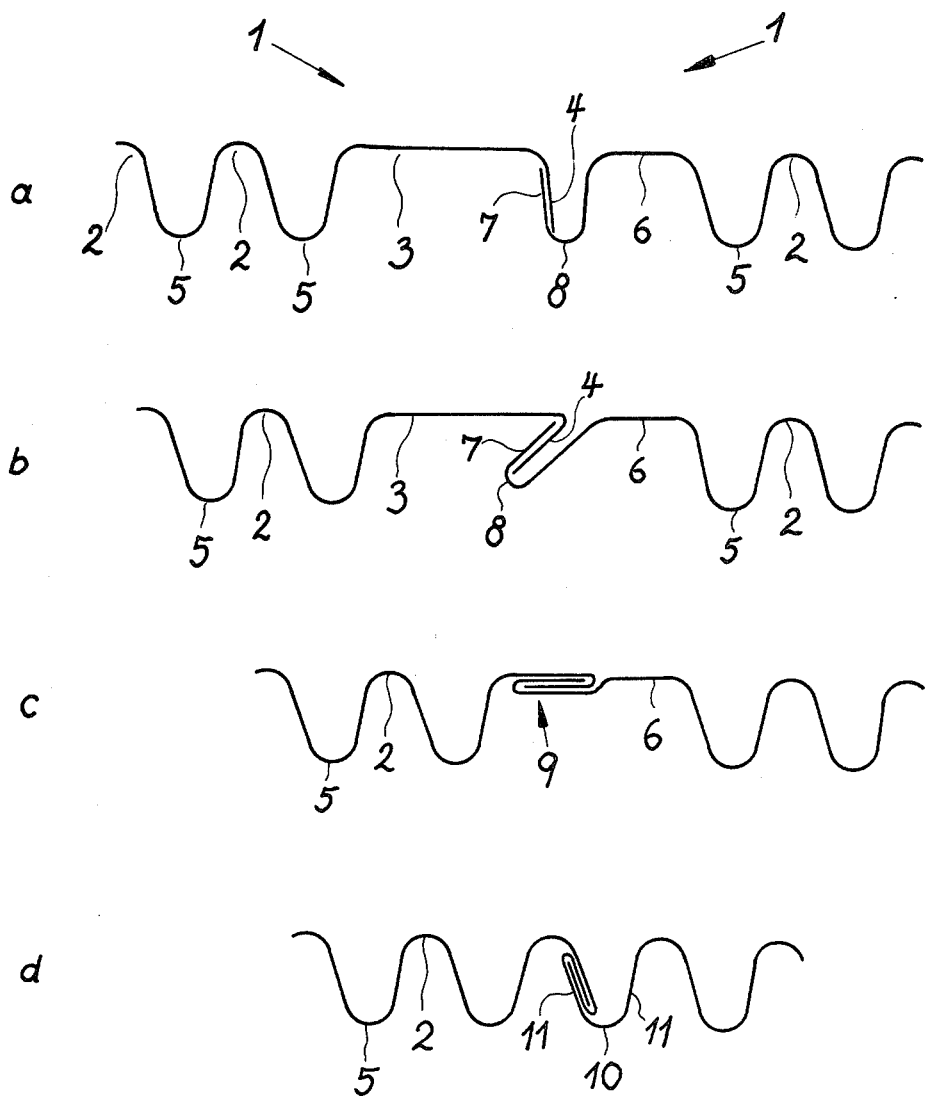

United States Patent [19]

Escandell

[11] Patent Number: 4,481,978

[45] Date of Patent: Nov. 13, 1984

[54] METHOD OF MANUFACTURING HELICALLY WOUND TUBES AND TUBES MANUFACTURED BY SAID METHOD

[75] Inventor: Manuel Escandell, Gütersloh, Fed. Rep. of Germany

[73] Assignee: Westaflex-Werk L.U.F. Westerbarkey GmbH & Co., Gütersloh, Fed. Rep. of Germany

[21] Appl. No.: 54,479

[22] Filed: Jul. 3, 1979

[30] Foreign Application Priority Data

Jul. 4, 1978 [DE] Fed. Rep. of Germany ....... 2829283

[51] Int. Cl.³ ..................... F16L 11/00; B21D 39/03; B23P 11/00
[52] U.S. Cl. ..................................... 138/122; 29/429; 29/505; 29/509; 138/150; 138/154; 138/173
[58] Field of Search ................. 29/505, 429, 781, 509; 138/122, 150, 154, 173

[56] References Cited

U.S. PATENT DOCUMENTS

| | | | |
|---|---|---|---|
| 3,621,884 | 11/1971 | Trikey | 138/154 |
| 3,815,639 | 6/1974 | Westerbarkey | 138/122 X |
| 3,938,558 | 2/1976 | Anderson | 138/122 |
| 4,029,129 | 6/1977 | Harper | 138/122 X |
| 4,108,212 | 8/1978 | Anderson et al. | 138/122 |
| 4,160,312 | 7/1979 | Nyssen | 29/429 |

*Primary Examiner*—Charlie T. Moon
*Attorney, Agent, or Firm*—Baxley, Charles E.

[57] ABSTRACT

A typical embodiment of the invention produces helically wound tubes from strips of thin plate in which adjacent edges are provided with interlocking ribs that are folded over to form a compressed bead. A further rib is formed at the bead, the bead providing one of the sides of the new-formed rib.

4 Claims, 32 Drawing Figures

METHOD OF MANUFACTURING HELICALLY WOUND TUBES AND TUBES MANUFACTURED BY SAID METHOD

The present invention relates to a method of manufacturing tubes helically wound from strips of thin plate or sheet which are at least partially pre-grooved parallel to their longitudinal edge, said tubes being beaded along the entire longitudinal edge of the strips, and tubes produced by this method.

Tubes of this type are known in which the bead which connects together the entire longitudinal edges of the plate or sheet strips which are wound to a tube lies in a surface parallel to the generatrix of the tube. The grooving of the tube is therefore interrupted in the region of the beads in the case of the known tubes. Since the beads must have a certain width and the strips from which the tubes are wound are in many cases relatively narrow, a rather unfavorable relationship therefore results between the area of the tube which is provided with grooves and the area of the tube in which the beads lie. This has considerable disadvantageous effects on various properties of such tubes. The tubes are essentially grooved in order to achieve a flexibility similar to the case of hoses and in order to be able to represent even relatively sharp bends or bends of small radius. Furthermore, such tubes can be extended or compressed due to their helical grooving so that for the laying of them, for instance, it is not necessary to cut them to precise lengths.

The known tubes in which the bead lies in the surface parallel to the generatrix of the tube has the disadvantage that because of this arrangement and development of the bead they cannot be bent as well around as narrow radii as tubes which are continuously grooved. Such tubes are manufactured by other methods. In this case, tubes are first of all wound from strips of the same or different material in the same direction and also in opposite direction in a plurality of layers which are then provided with helical grooves directly after they have been produced by the winding. Such tubes however are not suitable for all purposes of use; for example very thin metal sheets which are to be stiffened or reinforced with other materials such as paper or plastic can be used for this. In this way, for example, the heat resistance of such tubes is considerably limited. Furthermore, in the case of the last-mentioned tubes special measures are always necessary in order to assure coherance of the tube and of the individually wrapped strips even if the tube is cut at some point.

In the known beaded grooved tubes it has also been found disadvantageous that in the case of too sharp a bend, and in particular also in the case of repeated stressing in tension and repeated stretching, the bead tears open so that a typical form of damage, a tear in flypaper shape, occurs. Due to the fact that the beads are smooth in axial direction such known tubes can also not be compressed very greatly in axial direction. Of course, the peak compressive strength in the region of the beads is considerably less than in the region of the grooves.

The object of the present invention is to avoid the above-mentioned disadvantages of known tubes and to create from at least partially pre-grooved strips a helically wound tube in which the longitudinal edges of the strips are beaded and in which a continuous uniform grooving of the generatrix is present. In accordance with the invention this may be a single-ply or a multi-ply tube.

In order to achieve this goal one method of producing tubes of the aforementioned type is characterized by the fact that the pre-grooved strip provided at its longitudinal edge with a groove whose outer edge forms the edge and on its other longitudinal edge with a bend in the same direction as the groove is wound to form a tube in the manner that that the bend engages in the groove, whereupon this connection is bent over towards the side of the bend with compression to form the bead whereupon at the location of this bead there is developed another groove which contains the bead in its inner flanks. For the manufacture of tubes which consist of two plies, the method is characterized by the fact that after the wrapping of the first ply of tube a second ply of tube is wrapped thereon in the same manner, the bead being staggered by at least the width of an open groove, whereupon grooves are developed at the location of the bead with the forming of the bead in one of the flanks of the developed grooves. In this connection preferably the grooves with the beads are so developed that the beads in each case lie on the same side of the flanks of the grooves. The tube is advisedly wrapped flat in the region of the groove to be formed which is later to receive the bead.

A tube manufactured by the above method is characterized in accordance with the invention by the fact that it is provided completely with grooves having the same spacing. Advantageously it is pressed together to such an extent that the flanks of all grooves contact each other. In such a tube, the sheet metal strips are connected at their longitudinal edges to each other by folded beads which are arranged in the flank of a tube groove. The beads are developed in such a manner that a double undercut is produced. The connecting bead or beads which lie in a flank of the tube groove are preferably approximately radial to the axis of the tube.

In the method of the invention the bead is developed in a special manner along the entire longitudinal edges of the strip which is to be wound into a tube and therefore there is no additional labor as compared with the method previously employed. The advantages obtained thereby consist in the fact that, in addition to the purely optically changed appearance of the tube which shows a uniformly continuous grooving, the result is obtained that such a tube can be optimally compressed and pulled apart, in which connection all grooves including those grooves in which the bead is contained, are stressed uniformly and in the same manner. It is therefore also possible to compress such grooves and pull them apart substantially more frequently without the bead being thereby overstressed.

By the arranging of the bead in the flank of a groove the considerable advantage is obtained that this bead on the one hand forms a double undercut and is also no longer stressed in tension. On the other hand, due to the fact that the bead extends somewhat in radial direction there is obtained a substantial improvement in the peak compressive strength of the entire tube, particularly in the region of the bead. A tube in accordance with the invention can be laid in substantially smaller radii of bend than was previously the case with beaded tubes; furthermore, thinner plates and/or sheets can also be used for the manufacture of such tubes since the stressing in the region of the bead is substantially reduced or entirely eliminated. Up to now thin aluminum foils or plates were preferably used for the production of such tubes since the use of other metals frequently resulted in certain difficulties in the shaping and development of the tube. By the method in accordance with the invention such difficulties are overcome so that sheets of other metals and particularly also of alloy steel can be used for tubes in accordance with the invention.

Due to the fact that the bead is arranged radially and the tube is continuously grooved, such tubes can be compressed much more than was previously the case, namely to such an extent that the flanks of the grooves contact each other. Nevertheless such a tube can again be pulled apart to a very great length and also overstretched to such an extent that the grooves are developed almost into a slight ridge shape and the tube has practically a smooth surface. This process can be repeated several times without cracks being produced. Upon the stretching of the tube the bead is no longer stressed in tension since it lies within the flank of a groove. The flexibility of the tube is substantially improved.

In the DIN Standards three different types of tubes are defined, specifying their shape and properties. This definition was established on basis of the only possible different methods of manufacture and development of such tubes available up to now. A tube produced in accordance with the invention provides all the advantages and properties of all three of the said types of tubes.

Due to the fact that the bead or beads are arranged radially to the axis of the tube in the case of a tube in accordance with the invention, there is also no longer any back-springing action so that the bending, compressing or pulling apart of the tube can be effected without the application of any particular force and the shape once imparted is retained. Since the peak compressive strength of the tube is very substantially increased, particularly at the place of the bead, such a tube is not only substantially more resistant to mechanical stresses but it can also for this reason be made from a thinner material.

Since by the method in accordance with the invention the possibility is also afforded in a simple manner of producing two-ply tubes in which the individual plies are independent of each other but connected in completely secure form-locked manner by the narrow grooving, it is possible to produce such tubes substantially tighter than heretfore since the beads lie also at different places, are developed completely independently of each other, and are not connected with each other. In this respect considerable difficulties existed heretofore with such two-ply tubes. Since in the case of a a two-ply tube in accordance with the invention coated plate or sheet strips can be worked without difficulty or else together with each strip there can be wrapped strips of a different material placed parallel thereto, the invention affords the possibility of producing tubes which are provided with an additional layer or are coated on the inside and/or outside, and in addition to this may have a further coating or layer between the two layers. A tube in accordance with the invention can therefore have several different plies or layers in its wall.

The invention will be described below in greater detail with reference to illustrative embodiments, referred to the drawings in which:

FIGS. 1a to 1d show the method of producing a single-ply grooved tube in accordance with the invention, FIGS. 2a to 2g show the method of producing a double-ply tube, FIGS. 3a to 3g show the method of producing a double-ply tube having an additional outer ply or covering layer, FIGS. 4a to 4g show the method of producing a double-ply tube with an additional inner ply or covering layer, FIGS. 5a to 5g show the method of producing a double-ply tube with an additional ply or layer between the two plies.

In accordance with the invention, first of all strips of thin plate or sheet which are unwound in a generally known method from reels are pre-grooved in a special device, in which connection to be sure it is seen to it for the purposes of the further working that a smooth region then remains at the two edges. One of the two edges, namely that at which a somewhat wider region remains, is bent over in the direction of the grooving, approximately at right angles, while thereupon a groove is formed in the other edge of an adjoining narrower smooth region. There is produced a strip such as shown in continuous manner in profile view in FIG. 1a.

The central region of this strip designated generally as 1 is provided with a number of longitudinal grooves 2. On the one side of the strip, a wider region 3 has remained undeformed, its bend 4 being bent approximately at right angle in direction towards the ribs 5 lying between the grooves 2. On the other side of the strip a narrower region 6, about half as wide, has remained undeformed, the adjoining edge 7 of the strip being developed as rib 8.

If the strip 1 is wound helically on a core arranged above the profile shown in FIG. 1 in such a manner that first of all the winding corresponding to the left side of FIG. 1a is wound on and the winding corresponding to the right side of FIG. 1a follows, then the rib 8 developed at the edge 7 of the strip places itself above the bend 4, as shown in FIG. 1a. As a result of this, a certain guidance for the strip is obtained already upon the winding of the strip on the core.

A bead is then produced on the strip which has been wound up in said manner on the core directly following the winding process. For this purpose, as shown in FIG. 1b, the rib 8, with the bend 4 extending or hooked therein is folded over in the direction of the wide part 3 of the strip which has remained undeformed and in which the bend 4 is arranged and after complete folding is pressed together as shown in FIG. 1c. It can be noted that, in accordance with FIG. 1c, a connecting bead 9 with single undercut has already been formed. Directly thereafter, another rib 10 is formed on the winding core 4 at the region of the strip which has now been brought and wrapped together, in which the bead 9 is developed, corresponding to FIG. 1d. This rib is developed in the manner that the bead 9 is included in one of its flanks 11. In this way there is produced a double undercut bead and a tube which is continuously and uniformly grooved and in which therefore it can no longer be noted that there is concerned a tube which has been wound from a single sheet-metal strip and beaded.

FIGS. 2a to 2g show the various steps of the method of producing a double-ply tube. In this case also the core on which the pre-grooved strip is wound on in order to form a tube lies in each case above the profiled cross section shown in FIGS. 2a to 2g respectively. It is to be noted that the first steps for the production of the tube are the same as in the method described above for the production of a single-ply tube. In accordance with FIG. 2a, a strip whose edges overlap via a rib 8 and a bend 4 is first of all wound up on the core. The same reference numbers apply here in analogous manner as in the example previously described.

FIG. 2b shows that the rib 8 which overlaps the bend 4 on the one edge of the strip is folded over towards one side, namely towards the side of the strip on the edge of which the bend 4 is arranged. In this case the rib 8 is gradually pressed together so that initially the two strip edges 4 and 7 lie directly against each other and as a result of the corresponding shaping and stronger bending engage behind each other.

After the gradual folding over of the rib 8 with compression, stage 2c is then reached in which a bead 9 is developed in the surface of the tube directly outside the winding mandrel and therefore in the area of the regions 3 and 6 of the strip. Already at this stage another strip 12 is wound on the tube formed on the winding mandrel with the strip 1. This additional strip 12 is also pre-grooved with grooves 2' and ribs 5'. The strip 12 also has a bend 4' on the edge which is located to the rear in the direction of winding, the distance 3' between the bend 4' and the first rib 5' being substantially less than the distance 3 between the bend 4 and the first rib 5 of the first strip 1.

After further winding of the strip 12 of the second ply there is obtained the form corresponding to FIG. 2d. The opposite edge of the strip 12 has placed its rib 8' and the free outer flank 7' thereof over the bend 4' so that the strip is already connected in form-locked manner at this edge. Upon the placing on of this next winding of the strip 12 on the outside of the tube which has already been completed to this extent and forms the inner ply it is seen to it that the wide region 6' of the strip 12 of the second ply which has not been deformed upon the grooving is formed so as to rest tightly over the bead 9. From FIGS. 2e and 2f it can be noted that thereupon a bead 9' is formed at the strip 12 of the second ply in the same manner as was the case in connection with the strip 1 of the first ply. With gradual folding over and compressing of the rib 8 which overlaps the bend 4' the bead 9' is produced. From FIG. 2f it can be seen that the two beads 9 and 9' are developed in the inner wall surface of the tube between undeformed ungrooved parts of the wound strips. These are the regions 3 and 6 of the strip 1 and the regions 3' and 6' of the strip 2. In this connection the region 3 is originally as wide as the region 6' and the region 6 is originally as wide as the region 3'. The width of the regions is so adapted to each other that upon the final shaping of ribs, corresponding to FIG. 2g, on the winding core the beads 9 and 9' formed develop the flanks of two successive ribs 10 and 10'. Therefore it cannot be noted optically or only upon very close examination, on the tube produced in accordance with FIG. 2g, that this is a beaded tube or where these beads are located. From the said figure it can be readily seen that the aforementioned advantages are present.

In the following figures there are shown tubes produced by fundamentally the same method as in FIG. 2, the tubes consisting of strips which are provided with coatings or layers on one or both sides. In the case of FIG. 3 there is used as second outer strip such a strip which has a coating layer on its subsequent outer side, said coating layer being represented by the parallelly extending dashed line. This coating or layer 13 can consist of any suitable material; it can be represented in the form of a layer sprayed or otherwise applied onto the strip; however it may also be a sheet which is placed on or connected to the strip. The tube obtained in accordance with FIG. 3g is for all practical purposes a three-ply tube.

Figure 2:
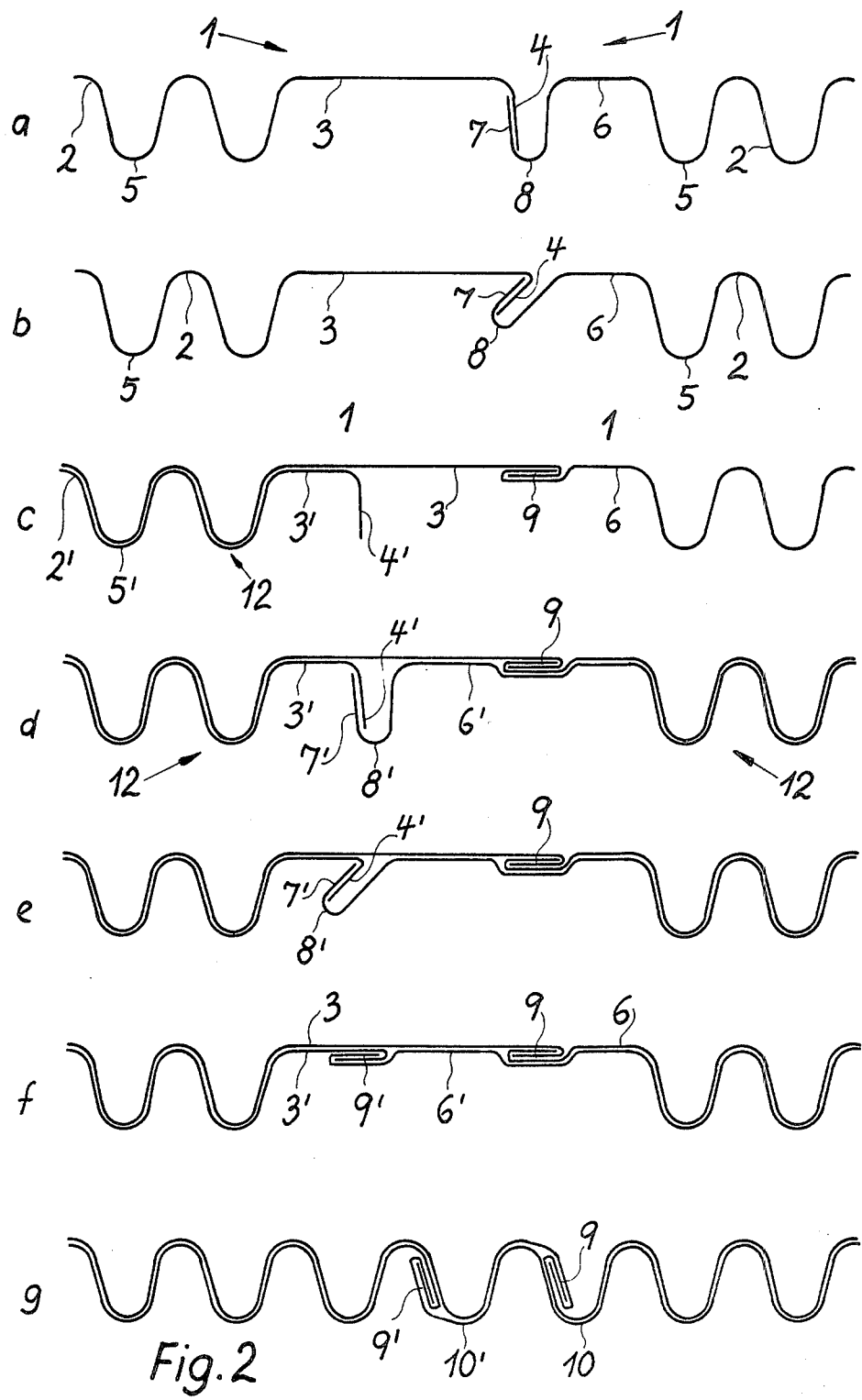
Figure 3:
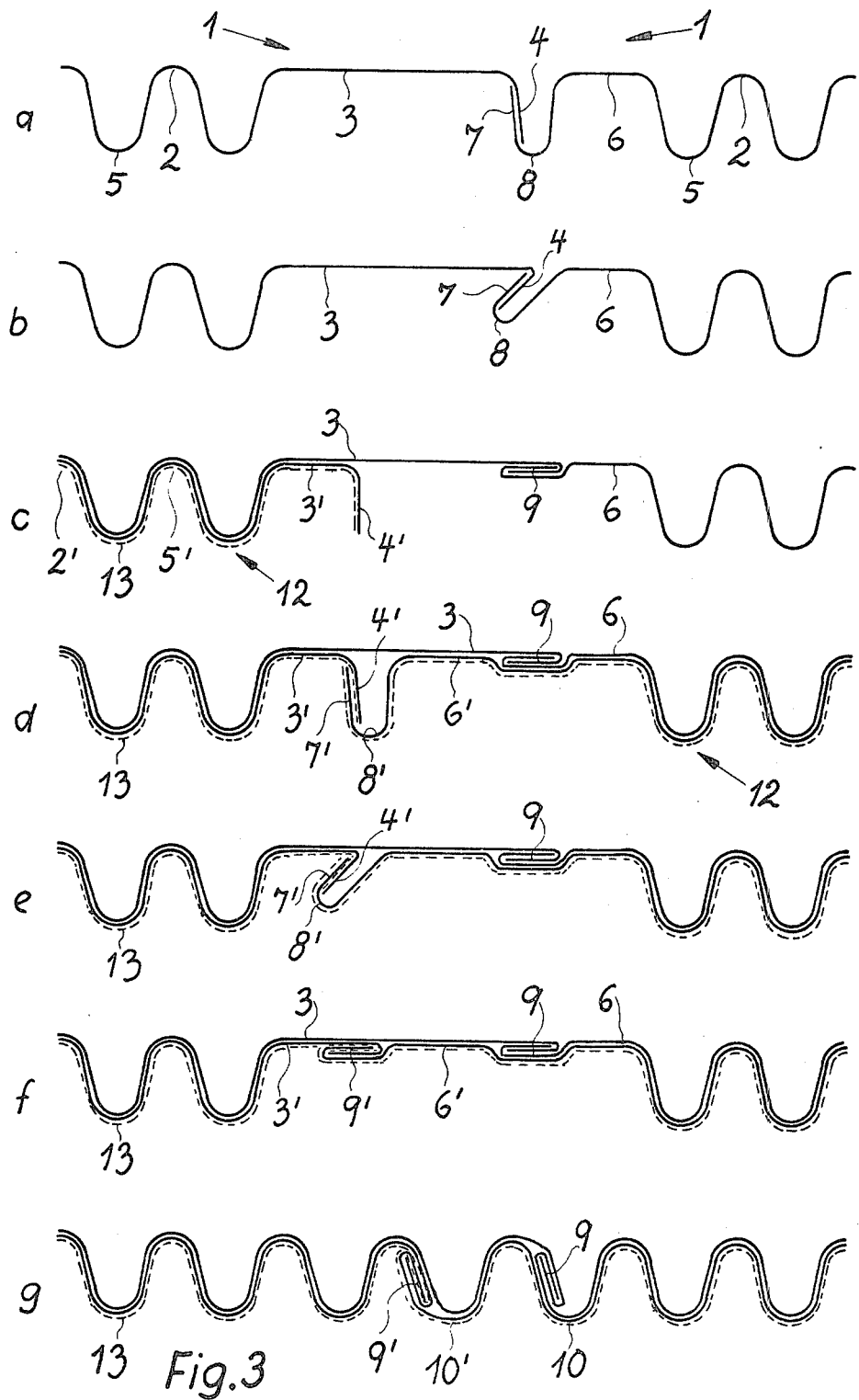
Figure 4:
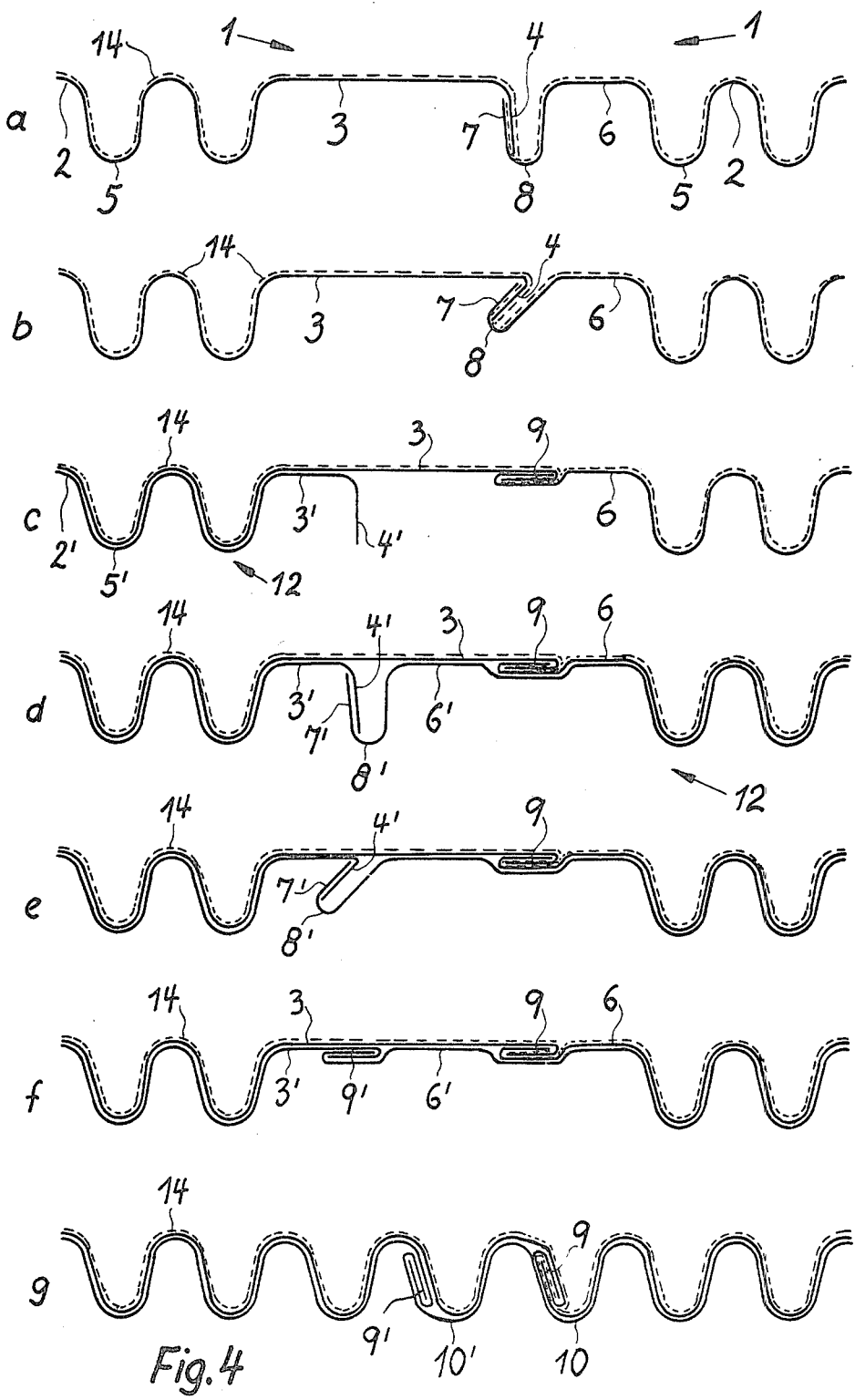

In accordance with the method of operation explained with reference to FIG. 2, FIG. 4 shows the production of a tube which also has three plies, the third ply, however, forming the inner ply and forming for instance an insulating of the wall of the tube which protects said wall from destructive attacks or else results in heat or sound insulation. In this case as tube 1 which is first wound on the core there is used such a strip which has been provided on its subsequent inner side with a layer 14 in the form of a coat of paint or insulating agent or else in the form of an applied or firmly connected sheet. The individual steps of the method for the manufacture of the tube corresponding to FIGS. 4a to 4g are the same as those described in detail with reference to FIG. 2. From the figures shown here it can be noted particularly clearly that as a result of the third ply 14 an additional sealing is to be developed also in particular in the bead 9 on the first inner strip so that an excellently sealed tube is produced. This could scarcely be achieved previously in tubes of this type. In this way there can also be developed a tube in which an inner covering or coating is present exclusively in the region of the subsequent bead so as to obtain a single ply or double ply which is provided with a special bead sealing.

Figure 5:
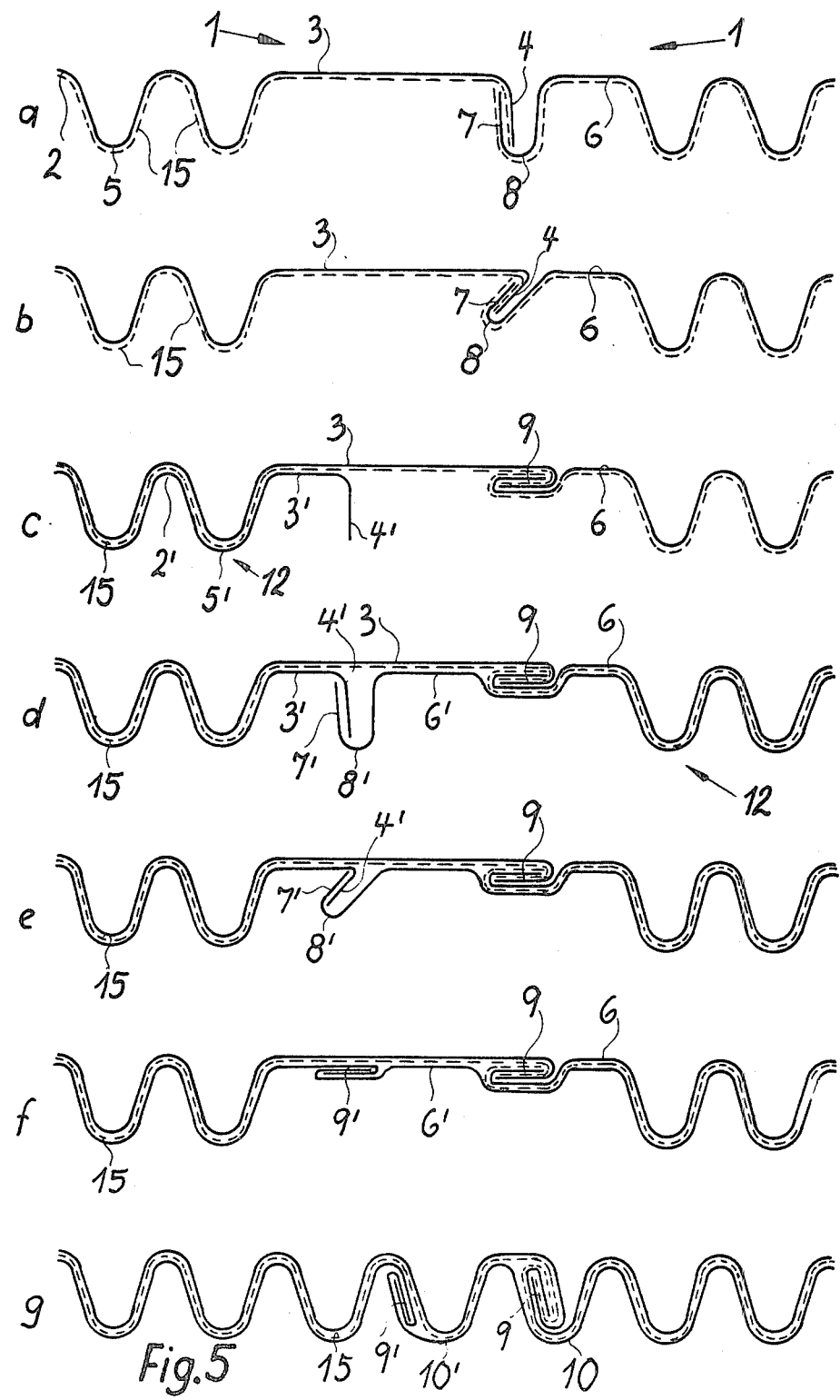

In accordance with the embodiment shown in FIG. 5, the strip which serves for the development of the inner ply of the tube is provided with an outer covering. This outer covering of the first strip can be applied already at the time of the production of the strip, as described in the case of the above examples with reference to FIGS. 3 and 4. The outer covering 15 of the inner strip can however also be wound on in the stage corresponding to FIG. 5c before a further strip which is to be beaded is wound on the core and on the strip which has already been beaded there. The cover layer 15 then forms a second ply in the wall of the tube and engages over the bead 9 which has already been completed. The ply 15 which subsequently forms an intermediate layer between the two beaded strips may, for instance be a non-woven fabric of non-burnable mineral fibers so that this layer forms a heat or flame insulation. Such a construction of a tube may be extremely advantageous, for instance, for exhaust pipes of internal combustion engines. A plurality of singly wound layers which may also have different physical properties can also be provided between the two layers which are beaded together.

I claim:

1. A method of producing from strips of thin plate or sheet which are at least partially pre-grooved parallel to their longitudinal edge, helically wound tubes which are beaded along the entire longitudinal edges of the strips, comprising the steps of providing a rib on the longitudinal edge of the pre-grooved strip whose outer arm forms a narrow region that has an edge bent approximately at a right angle to form a rim which is shorter than the depths of the grooves, providing on the other longitudinal edge of the pre-grooved strip a region about twice as wide as said narrow region that has a bend in the same direction as the rib which is shorter than the depths of the grooves, winding the strip into a tube, engaging the bend in the rim, folding the engaged bend over towards the side of the bend and against said twice as wide region, compressing the folded bend into a bead, and forming thereupon a further flat rib at the place of this bead in said narrow and about twice as wide regions, which further rib contains the bead included in a portion of one of its flanks, said portion being included within the flank and smaller then said whole flank, comprising after said step of compressing said folded bend into a bead, the further steps of winding a grooved second tube ply thereon in which a wide region that has an edge bent approximately at a right angle to form a rim which is shorter than the depths of the grooves is positioned adjacent to said wide region on said beaded tube, providing on the other longitudinal edge of the second tube a region about half as wide as said wide region that has a bend in the same direction as the rib which is shorter than the depths of said second tube grooves, compressing the folded bend into another bead that is spaced from said beaded tube bead by the width of an open groove, forming grooves or ribs at the beads, and forming the second tube bead in one of the flanks of the formed grooves which second tube bead is included within said flank and is smaller than said whole flank of which it is a part.

2. A method according to claim 1, comprising the further step of developing the grooves or ribs having the beads to enable the beads in each case to lie on the same side of the flanks of the grooves.

3. A method according to claim 1, comprising the further step of winding flat nondeformed regions in the region of the groove to be formed and subsequently to receive the bead.

4. Tube manufactured by the method according to claim 1, comprising the further step of providing grooves of equal spacing, the beads being arranged in the flanks of the grooves.

* * * * *